United States Patent [19]
Ishikawa et al.

[11] Patent Number: 5,225,744
[45] Date of Patent: Jul. 6, 1993

[54] POWER UNIT FOR ELECTRIC CARS

[75] Inventors: Masami Ishikawa; Yukihiro Minezawa, both of Tokyo, Japan

[73] Assignee: Aisin Aw Co., Ltd., Japan

[21] Appl. No.: 690,838

[22] Filed: Apr. 27, 1991

[51] Int. Cl.$^5$ ............... B60K 41/00; B60L 11/18
[52] U.S. Cl. .................................................. 318/139
[58] Field of Search ............... 318/139, 106; 180/65.1, 180/65.2, 65.3, 65.4, 65.8

[56] References Cited

U.S. PATENT DOCUMENTS

| | | | |
|---|---|---|---|
| 3,930,552 | 1/1976 | Kunkle et al. | 180/68.5 |
| 4,090,577 | 5/1978 | Moore | 318/139 X |
| 4,099,589 | 7/1978 | Williams | 180/65 A |
| 4,199,037 | 4/1980 | White | 180/65 C |
| 4,306,156 | 12/1981 | Monaco et al. | 318/139 X |
| 4,313,080 | 1/1982 | Park | 290/16 X |
| 4,339,015 | 7/1982 | Fowkes et al. | 180/68.5 |
| 4,351,405 | 9/1982 | Fields et al. | 318/139 X |
| 4,405,028 | 9/1983 | Price | 180/65 E |
| 4,438,342 | 3/1984 | Kenyon | 180/65 R |
| 4,450,400 | 5/1984 | Gwyn | 320/2 |
| 4,593,779 | 6/1986 | Krohling | 180/65.4 |
| 4,723,105 | 2/1988 | Matouka et al. | 307/16 X |
| 4,923,025 | 5/1990 | Ellers | 180/65.2 |
| 4,962,462 | 10/1990 | Fekete | 364/492 |
| 5,119,011 | 6/1992 | Lambert | 318/139 X |

Primary Examiner—Bentsu Ro
Attorney, Agent, or Firm—Lorusso & Loud

[57] ABSTRACT

Herein disclosed is a power unit for an electric car, which comprises: a first power supply mounted on the electric car and adapted to be always used; and a second power supply mounted on the electric car, if necessary. The first power supply may include a battery for effecting a travel of low speed and short distance by itself. The second power supply may include a battery module for effecting a travel of high speed and short distance and a generator module for effecting a travel of high speed and long distance.

1 Claim, 10 Drawing Sheets

POWER UNIT FOR ELECTRIC CARS

BACKGROUND OF THE INVENTION

1. Field of the Invention

The present invention relates to an electric car and, more particularly, to a power unit for the electric car.

2. Description of the Prior Art

Figure 10A:
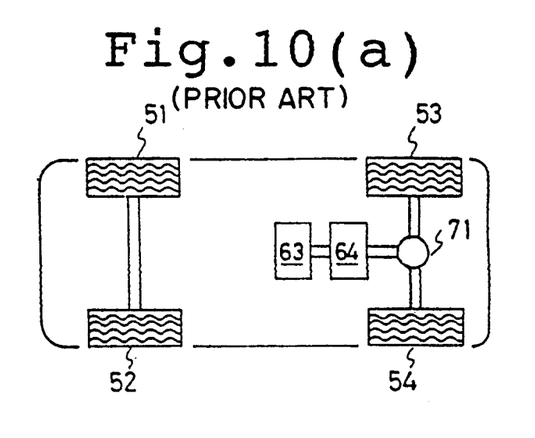
FIGS. 10(a), 10(b), 10(c), 10(d) and 10(e) are diagrams showing an electric car of the prior art and an example of the power supply of the electric car.
Figure 10B:
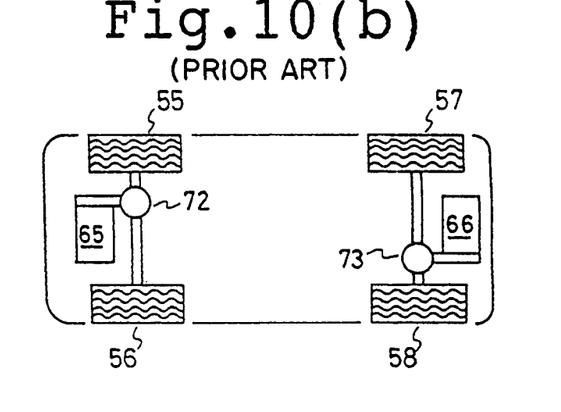
Figure 10C:
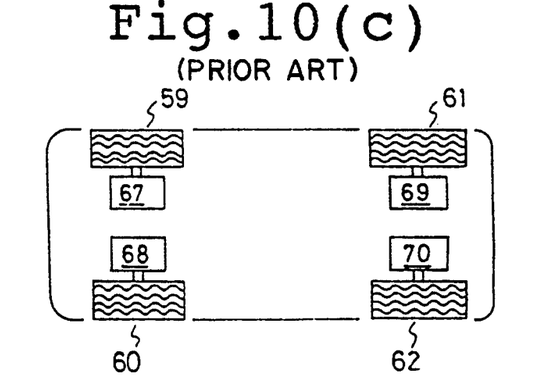
Figure 10D:
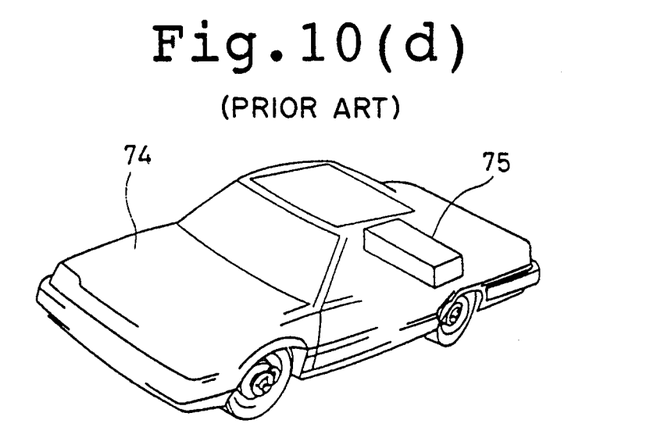
Figure 10E:
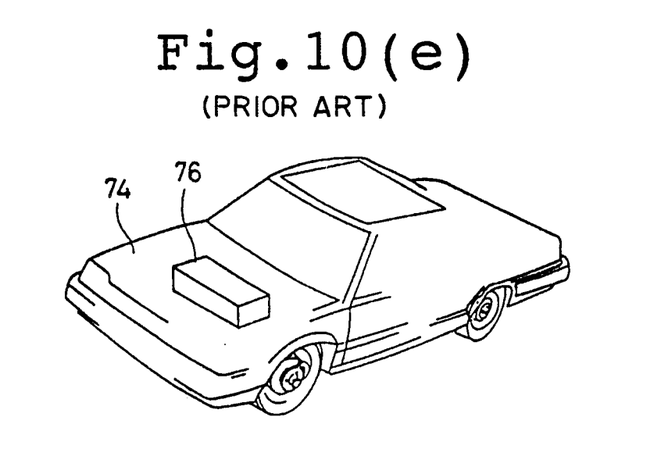

In the prior art, there is known an electric car on which a motor is mounted as a drive source. FIGS. 10(a), 10(b), 10(c), 10(d) and 10(e) are diagrams showing examples of the structure of electric cars of the prior art. FIG. 10(a) shows an example in which two motors 63 and 64 are arranged in tandem to drive front or rear wheels. FIG. 10(b) shows an example in which two motors 65 and 66 are separately disposed to drive the front and rear wheels, respectively. FIG. 10(c) shows an example in which four separate motors 67, 68, 69 and 70 are used to drive the four wheels, respectively. Reference numerals 51 to 62 designate wheels; and numerals 71 to 73 designate differential gears. Moreover, the power unit for driving those motors is usually exemplified by a battery such as a lead battery or a generator and is mounted adjacent the rear wheels, as shown in FIG. 10(d) or adjacent the front wheels, as shown in FIG. 10(e). In FIGS. 10(d) and 10(e), numeral 74 designates a car body, and numerals 75 and 76 designate batteries.

However, the electric car of the prior art is accompanied by a problem that it cannot sufficiently cope with the various running conditions required of the vehicle where its motors are energized by the battery only, which is fixedly mounted thereon. Generally speaking, an electric car operates under various running conditions such as travel over a short distance, travel over a long distance, travel at a low speed, and travel at a high speed. A battery has a high power density so that it can produce a high current for a short time, but has a low energy density, i.e., a low energy output per unit volume. As a result, an electric car powered by a battery can only travel a short distance and is unable to satisfy all the various running conditions.

SUMMARY OF THE INVENTION

An object of the present invention is to solve the above-specified problems and to provide a power unit for an electric car, which is able to supply power according to the running condition which it encounters.

In order to achieve the above-specified object, according to the present invention, there is provided a power unit for an electric car, which comprises: a first power supply mounted on the electric car; and connection facilities for optionally mounting a second power supply on the electric car, as required.

According to the present invention, the power unit comprises the first power supply mounted at all times and the second power supply for being optionally mounted on electric car, as required, so that it can easily adapt to various running conditions. Specifically only the first power supply is used for travel at low speed over a short distance; the second power supply is exemplified by a battery module for travel at high speed over a short distance; and the second power supply is exemplified by a generator module for travel at high speed over a long distance. Thus, the power unit can be constructed according to the aimed object.

In case, on the other hand, the second power supply is not used, its mounting area can be used for accommodating baggage so that the space can be effectively exploited.

BRIEF DESCRIPTION OF THE ACCOMPANYING DRAWINGS

Other objects, advantages and features of the present invention will become apparent from the following description considered in conjunction with the accompanying drawings, in which.

DESCRIPTION OF THE PREFERRED EMBODIMENT

An embodiment of the present invention will be described in the following with reference to the accompanying drawings.

Figure 1A:
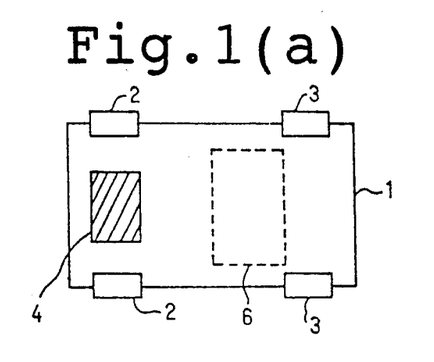
FIGS. 1(a) and 1(b) are diagrams showing the structure of one embodiment of a power supply for an electric car in accordance with the present invention.
Figure 1B:
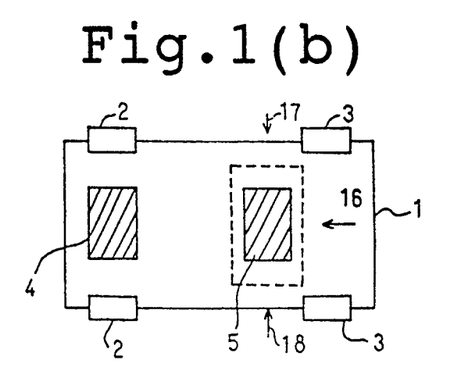

In FIGS. 1(a) and 1(b) reference numeral 1 designates a car body; numeral 2 designates front wheels; numeral 3 designates rear wheels; numeral 4 designates a first power supply; numeral 5 designates a second power supply; and numeral 6 designates a position to mount the second power supply 5.

The first power supply 4 is one which is mounted adjacent the front wheels 2, as shown in FIG. 1(a), to retain the minimum necessary electric power and which is suitably exemplified by a battery. On the other hand, the second power supply 5 is one which is mounted adjacent the rear wheels 3, as shown in FIG. 1(b), and which can be exemplified by a battery module composed of batteries or a generator module composed of an engine and a generator. Although the first power supply 4 and the second power supply 5 are shown mounted adjacent the respective front wheels 2 and rear wheels 3, as shown in FIG. 1, they could be mounted vice versa. Namely, it is apparent that the first power supply 4 could be mounted adjacent the rear wheels 3 while the second power supply 5 could be mounted adjacent the front wheels 2.

Figure 2A:
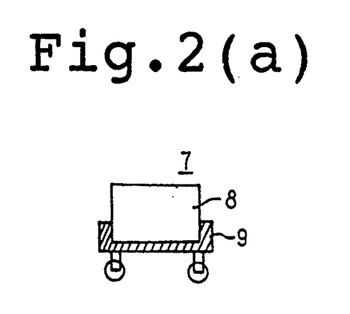
FIGS. 2(a) and 2(b) are diagrams showing an example of the structure of a second power supply.
Figure 2B:
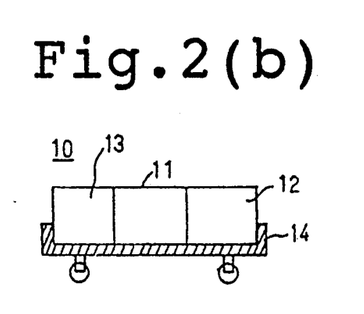

The second power supply 5 is mounted in a predetermined position 6, as indicated in FIG. 1(b). Since, however, the battery and/or generator to be used as the second power supply 5 is generally large-sized and has a weight of about 100 Kg, it is necessary to facilitate loading and unloading. Thus, the second power supply 5 is constructed, as shown in FIGS. 2(a) and 2(b). FIG. 2(a) exemplifies the structure of the battery module 7, which is constructed of a battery 8 and a truck 9 such that the former 8 is fixed on the latter 9 by not-shown fixing means. On the other hand, FIG. 2(b) shows an example of the structure of the generator module 10, which includes a generator unit 11 for generating electricity, an engine unit 12 for driving the generator unit 11, and a change-over circuit unit 13 for switching the connection states of the first power supply 4 and the generator unit 11 in accordance with the running state, all fixed on a truck 14 by not-shown means, respectively. The change-over circuit unit 13 is described hereinafter.

Figure 3:
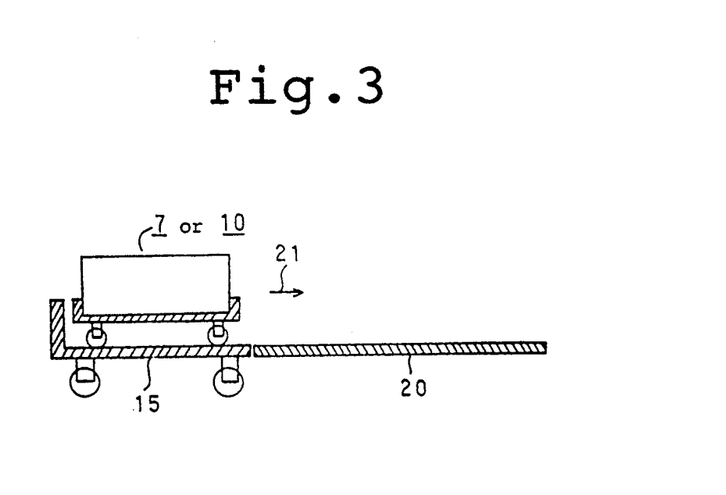
FIG. 3 is a diagram showing the operations of loading and unloading the second power supply.
Figure 4:
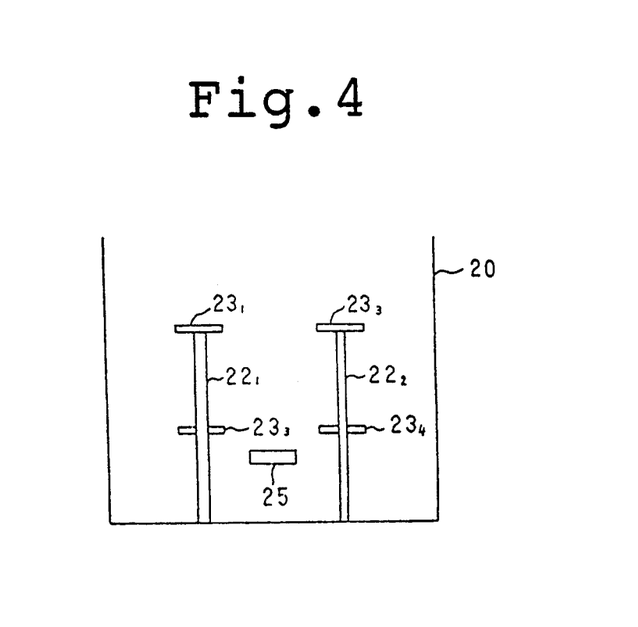
FIG. 4 is a diagram showing an example of the structure for loading and unloading the second power supply.

As shown in FIG. 3, the battery module 7 or the generator module 10 is loaded on the floor of a truck 15, which is generally at the same level as that of the floor 20 of the car body 1, and the module 7 or 10 is pushed together with its truck in the direction of arrow 21 to load the module in the car. The loading of the battery module 7 or the generator module 10 as the second power supply 5 may be directed from the back of the car body 1, as indicated at arrow 16 in FIG. 1(b), or from the side of the car body 1, as indicated at arrow 17 or 18. Alternatively, however, rails $22_1$ and $22_2$ having the same width as that of the wheels of the truck of each module may be laid, and stops $23_1$, $23_2$, $23_3$ and $23_4$ may be arranged, as shown in FIG. 4, so as to facilitate movement of the second power supply 5 and to fix the same on the car body 1. Reference numeral 25 appearing in FIG. 4 designates an electrical plug or connector to be connected with the (not-shown) pin or mating connector of the second power supply 5. When the second power supply 5 has its pin inserted into the plug 25, it is electrically connected in a predetermined state with the first power supply 4 so that the assembly of the power unit of the electric car is completed.

Figure 5A:
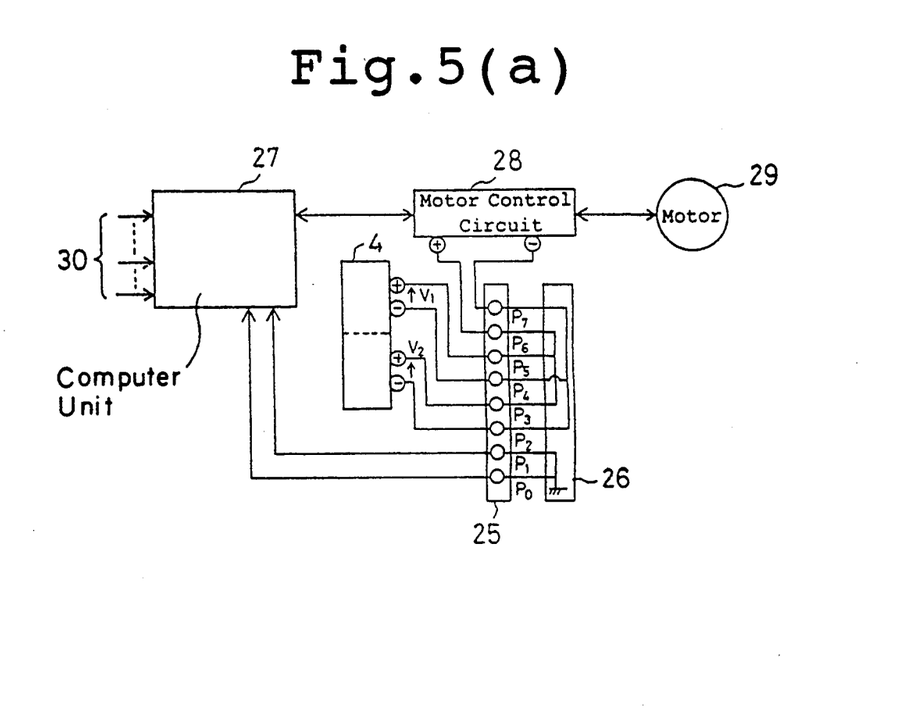
FIGS. 5(a), 5(b) and 5(c) are diagrams showing the circuit structure in a first mode.
Figure 5B:
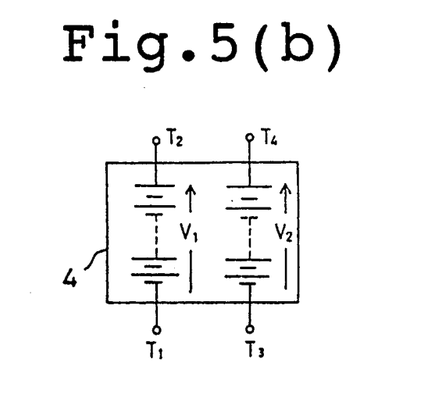
Figure 5C:
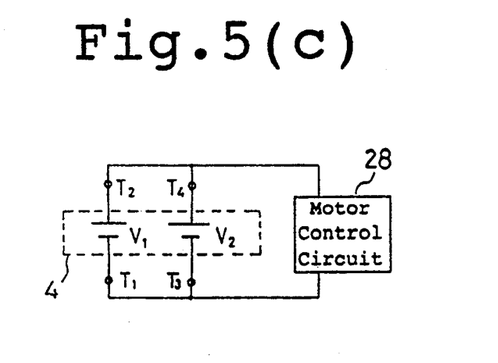

FIGS. 5(a), 5(b) and 5(c) are diagrams showing the power unit when only the first power supply 4 is used (hereinafter called the "first mode"). In this case, a dummy pin 26 is inserted into the plug 25, as shown in FIG. 5(a). As shown, the plug 25 is equipped with eight ports, of which ports $P_7$ and $P_6$ are respectively used as negative and positive output terminals for a motor control circuit 28. The dummy pin 26 is constructed, as shown, to connect ports $P_2$, $P_4$ and $P_7$ together, to connect ports $P_3$, $P_5$ and $P_6$ together and to ground ports $P_0$ and $P_1$. Here, it is assumed that the first power supply 4 is equipped with two cell units having voltages $V_1$ and $V_2$, as shown in FIG. 5(b), and have their terminals $T_1$, $T_2$, $T_3$ and $T_4$ connected with the ports $P_4$, $P_5$, $P_2$ and $P_3$ of the plug 25, respectively. Then, the two cell units of the first power supply 4 are connected in parallel with the motor control circuit 28 by the dummy pin 26, as shown in FIG. 5(c). The ports $P_0$ and $P_1$ of the dummy pin 26 are used as signal lines for a computer unit 27 which is composed of computer control means such as a microprocessor and a memory such as RAM or ROM. The computer unit 27 is enabled by the signal lines $P_0$ and $P_1$ to decide whether or not the second power supply 5 is mounted, and, if YES, whether the second power supply 5 in the battery module 7 or the generator module 10. In case the dummy pin is inserted, both the levels of the ports $P_0$ and $P_1$ are at a low (L) level. Then, the computer unit 27 decides that the second power supply 5 is not mounted. The computer unit 27 not only decides the presence and kind of the second power supply 5, as described above, but also determines a current value to be fed to a motor 29, in response to the outputs of various sensors including a speed sensor, a brake sensor and an accelerator opening sensor, and commands the motor control circuit 28. This motor control circuit 28 is one composed of a switching circuit or the like to switch its internal circuit on the basis of the command of the computer unit 27 to feed the motor a current, as commanded. Incidentally, the specific circuit structure of the motor control circuit 28 is well known in the art, and its detailed description will be omitted. Moreover, only one motor 29 is shown but it represents all the motors that are used in the electric car under consideration. Thus, the structure shown in FIGS. 5(a), 5(b) and 5(c) can be applied to not only the structure shown in FIG. 10(a) but also the structures shown in FIGS. 10(b) and 10(c).

The structure thus far described belongs to the first mode using the first power supply 4 only. The maximum speed is about 80 Km/h, if the voltages $V_1$ and $V_2$ are about 100, and the maximum travel distance is about 40 Km for a proving-ground run at 40 to 60 Km/h. This is sufficient for use of the electric car at low speed and for travel over a short distance. Since, in this case, the second power supply is not mounted, its mounting space can be used for accommodating baggage so that the space can be effectively exploited. Since the generator module 10 is not mounted, considerable noises generated from the generator unit 11 are avoided, and a more comfortable drive can be enjoyed because of less noise with the structure shown in FIGS. 5(a), 5(b) and 5(c).

Figure 6A:
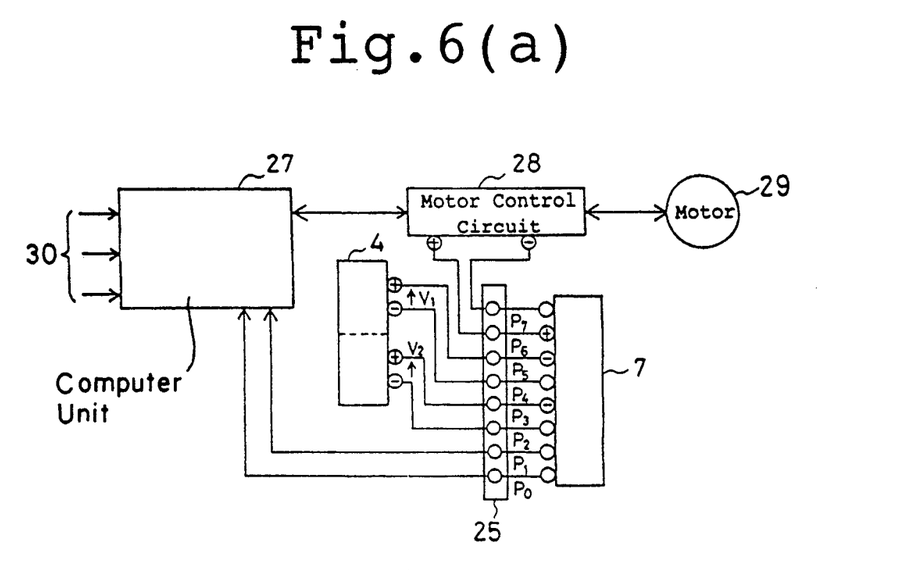
FIGS. 6(a), 6(b) and 6(c) are diagrams showing the circuit structure in a second mode.
Figure 6B:
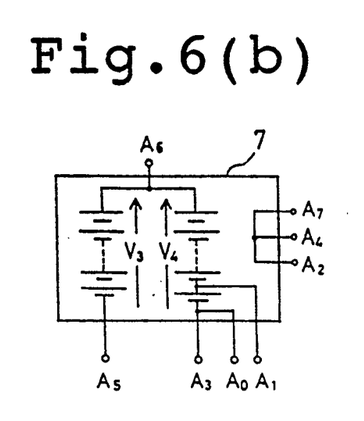
Figure 6C:
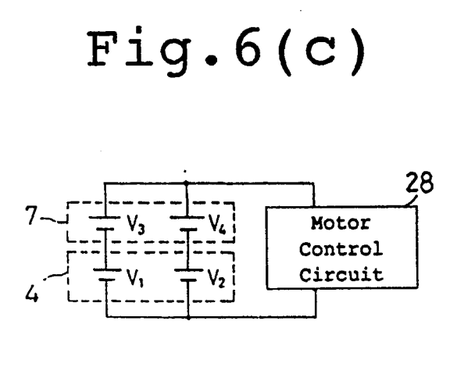

FIGS. 6(a), 6(b) and 6(c) are diagrams showing the battery module 7 used as the second power supply 5 (hereinafter called a "second mode"). In this case, the battery module 7 has a structure, as shown in FIG. 6(b). If the battery module 7 has its terminals $A_0$, $A_1$, $A_3$, $A_4$, $A_5$, $A_6$ and $A_7$ connected with the ports $P_0$, $P_1$, $P_2$, $P_3$, $P_4$, $P_5$, $P_6$ and $P_7$ of the plug 25, respectively, the circuit shown in FIG. 6(c) is constructed. Moreover, the signal line for the computer unit 27 is connected to two terminals of one cell in cell unit $V_4$ so that the port $P_0$ is at the L level and the port $P_1$ is at the high (H) level. As a result, the computer unit 27 can recognize that the battery module 7 is mounted as the second power supply 5, thus making it unnecessary to provide any special cell for the signal line. Alternatively, the signal line may be obtained from a cell unit $V_3$ and the ports $P_0$ and $P_1$ may have reverse levels.

If cell units $V_3$ and $V_4$ in the structure of FIG. 6(a) are individually at about 50 V, the total output voltage of the whole power unit in addition to that of the first power supply 4 is about 150 V. As a result, the maximum speed is about 110 Km/h, and the maximum travel distance is about 60 Km for the proving-ground run at 60 Km/h. Thus, the power unit of FIGS. 6(a), 6(b) and 6(c) provides for use of the electric car at high speed and for a short distance. Since, moveover, the power unit includes only batteries, a comfortable drive can be enjoyed because of no noise like the structure shown in FIGS. 5(a)-(c).

Figure 7A:
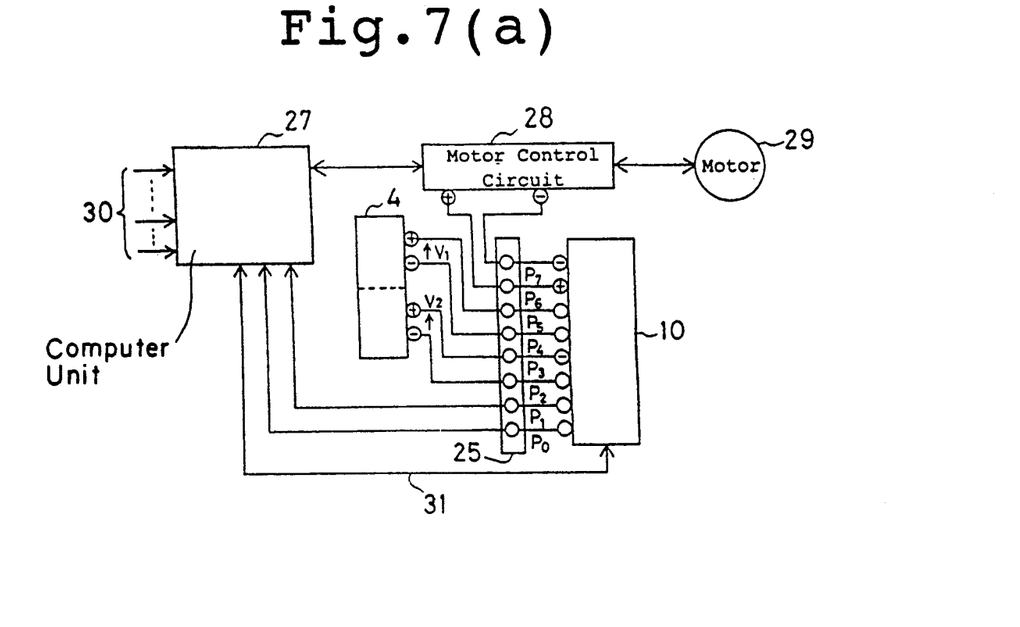
FIGS. 7(a), 7(b) and 7(c) are diagrams showing the circuit structure in a third mode.
Figure 7B:
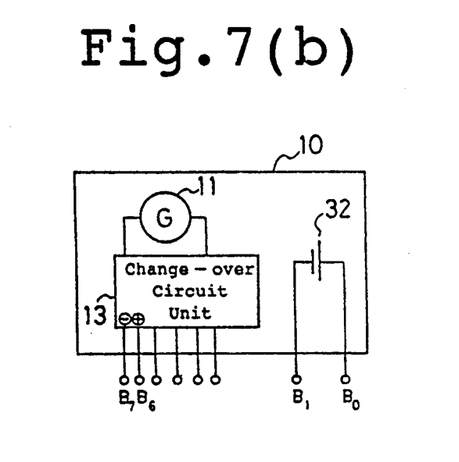
Figure 7C:
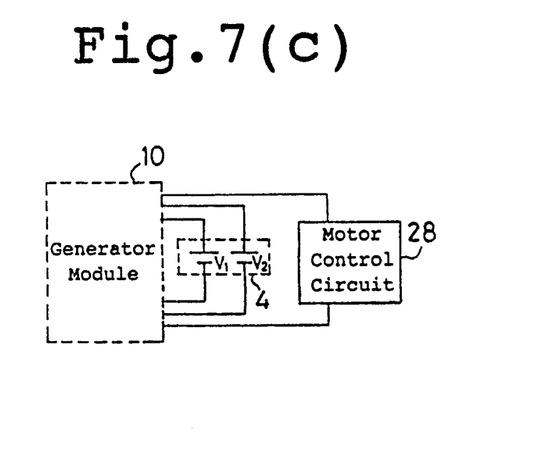

FIGS. 7(a), 7(b) and 7(c) are diagrams showing the generator module 10 used as the second power supply (hereinafter called a "third mode"). In this case, as shown in FIG. 7(a), the pin of the generator module 10 is connected with the plug, and also a control line is connected between the generator module 10 and the computer unit 27 for control of the change-over circuit 13. In the circuit of the generator module 10, as shown in FIG. 7(b), the output of the generator 11 is connected with the change-over circuit unit 13, and this change-over circuit unit 13 has its positive output terminal $B_6$ and negative output terminal $B_7$ connected with the ports $P_6$ and $P_7$ of the plug 25, respectively. The unnumbered terminals of the change-over circuit unit 13 are connected with the ports $P_2$ to $P_5$ of the plug 25 so that the circuit structure shown in FIG. 7(c) is made. The details of the connection between the first power supply 4 and the generator module 10 are not shown in FIG. 7(c). This connection between the cell units $V_1$ and $V_2$ and the generator unit 11 is switched between parallel and series connections, or the internal circuit is switched to charge up the cell units $V_1$ and $V_2$ by the generator unit 11, as will be described hereinafter. Moreover, the generator module 10 has its terminals $B_0$ and $B_1$ connected with the ports $P_0$ and $P_1$ of the plug 25, respectively, so that the port $P_0$ has an H level voltage and the port $P_1$ has an L level voltage. As a result, the computer unit 27 can recognize that the generator module 10 is mounted as the second power supply 5. A cell 32 may be especially provided for establishing the voltage on the terminals $B_0$ and $B_1$ and can be used to act as a battery for the starter to start the engine unit 12 of the generator module 10. The connection of the control line 31 can be achieved by arranging suitable terminals.

The power unit shown in FIGS. 7(a), 7(b) and 7(c) produces considerable noise because the generator unit 11 is used. Since the voltage between the output terminals of the change-over circuit unit 13 can be changed from about 100 V to about 200 V at the maximum, the maximum speed obtainable is about 110 Km/h, and the maximum travel distance is about 500 Km for a proving-ground run at 60 Km. Thus, the power unit of FIGS. 7(a), 7(b) and 7(c) can attain the object of both high speed and long distance travel easily. Since the battery and the generator are used together in the structure shown in FIGS. 7(a), 7(b) and 7(c), the power density is borne by the battery, and the energy density is borne by the generator, so that the electric car can travel a long distance at a high speed.

Figure 8:
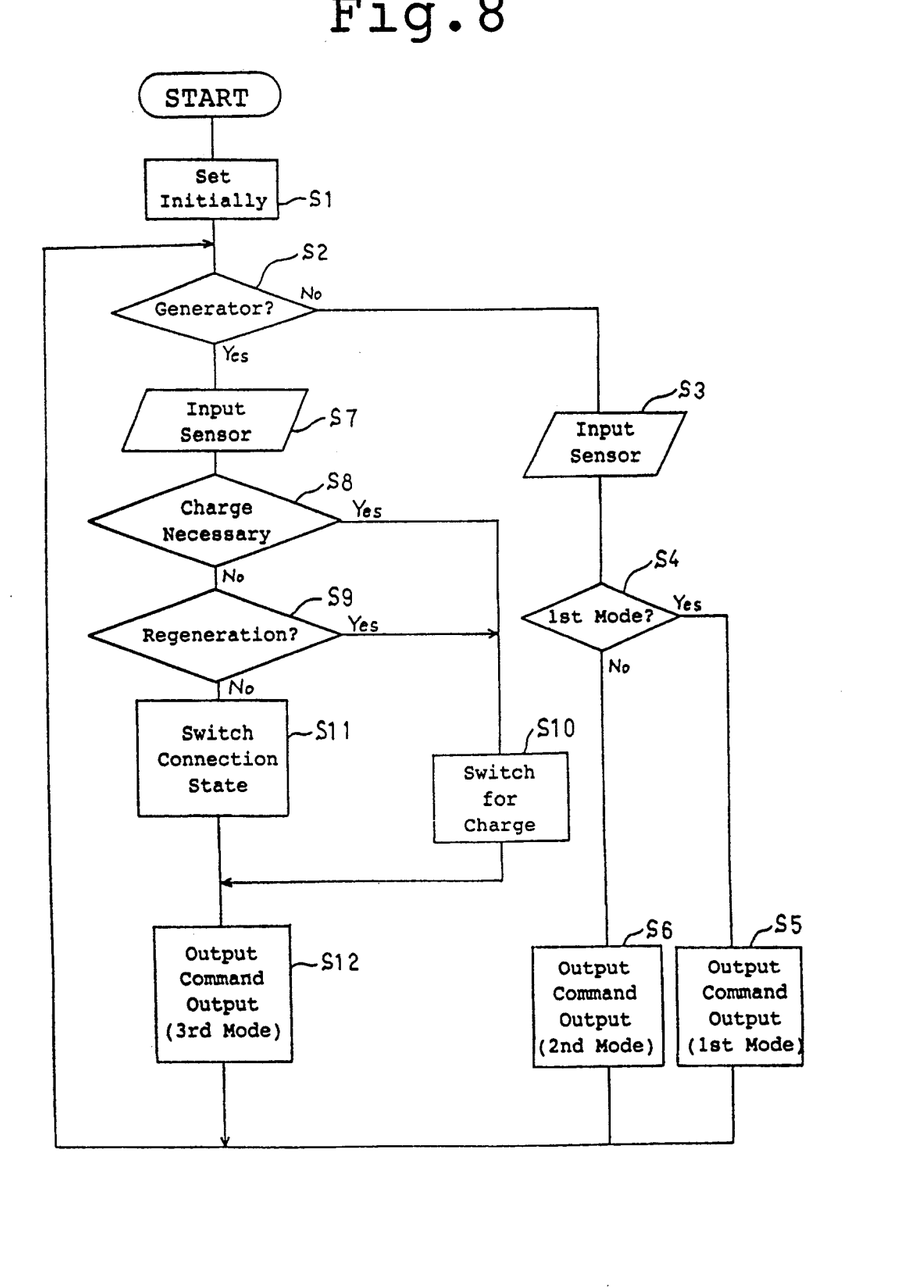
FIG. 8 is a flow chart showing the processing to be executed by a computer.

Next, the flow chart to be processed by the computer unit 27 will be described. FIG. 8 is a flow chart showing the processing flow to be accomplished by the computer unit 27. First of all at Step S1, initial states necessary for starting a predetermined processing are set and the computer is initialized such as by clearing the work area of the RAM. After this initial setting, the computer unit 27 detects the level of the signal line to decide (at Step S2) whether or not the generator module 10 is present. Since the generator module 10 is not present in the aforementioned first and second modes, the signals from the sensors are fetched at Step S3 to decide at Step S4 whether the power unit is in the first or second mode. The routine advances to Step S5, if in the first mode, and to Step S6 if in the second mode. In these modes, the desired driving forces of the motor 29 are determined to command the motor control circuit 28 to control the flow of electric current to establish such driving forces.

One method for determining the driving force of the motor 29 uses a lookup table (LUT) which includes the appropriate commands at addresses based upon the speed and the accelerator opening of the car, for example. In this case, the outputs of the speed sensor and the accelerator opening sensor are inputted at Step S3. Then, a proper driving force can be determined by addressing the corresponding LUT for the first or second mode. The motor driving forces in the first mode as determined at Step S5 are generally lower than the driving forces in the second mode determined at Step S6. This is because the first mode uses the first power supply 4 only whereas the second mode uses not only the first power supply 4 but also the battery module 7. The driving force determining method described above is only one example and a variety of other methods known in the art can be employed. In case a plurality of motors are used, all of them may have an equal driving force. Alternatively, the individual driving forces of the motors may be written in corresponding LUTs so that the driving forces may be determined for the motors on the basis of the individual LUTs.

As described above, the driving force is determined at Step S5 or S6, and the command value is outputted to the motor control circuit 28. Then, the computer unit 27 loops back to the processing routine at Step S2. This loop is executed at predetermined time intervals.

The operations thus far described are those in the first and second modes. Since the generator is present in the third mode, the routine of Steps S7 to S12 is executed. At the sensor inputting step of S7, the outputs of the various sensors are fetched to decide at Step S8 whether or not it is necessary to charge the batteries of the first power supply 4, at Step S9 whether or not regeneration is to be performed, and at step 12 the motor driving force and the command value of the driving force to the motor control circuit 28. The decision at step S8 is to charge up the first power supply 4 with a portion of the electric power generated in the generator unit 11 when the residual power in the battery of the first power supply 4 is below a predetermined value, e.g., 70% or less. If "YES" is decided at Step S8, the circuit of the change-over circuit unit 13 is switched to feed a portion of the output of the generator unit 11 to the first power supply 4 so that the battery is charged. Incidentally, the charging circuit is well known in the art, and its detailed description is omitted. The method of determining the residual power of the battery can be either by determining residual power on the basis of an internal impedance determined from an inter-terminal voltage and a discharge current or by determining residual power by means of a LUT addressed by a detected inter-terminal voltage, discharge current and cell temperature, as has been proposed by us in Japanese Patent Application Sho 62-302443. In the former, the interterminal voltage and the discharge current are fetched at Step S7 from a voltage sensor and a current sensor respectively. In the latter, the battery temperature in addition to the inter-terminal voltage and the discharge current is fetched from a temperature sensor.

In case it is decided at Step S8 that battery charging is unnecessary, it is decided at Step S9 whether or not to perform regeneration. If YES, the routing is branched to Step S10, at which the first power supply 4 is connected for charging. This is because the first power supply 4 is to be charged in case of regeneration, i.e., in case the brake pedal is depressed, so that the output of the generator unit 11 may be effectively exploited. At Step S7, therefore, the output of the brake sensor is also fetched.

If it is decided at Step S9 not to perform regeneration, the circuit of the change-over circuit unit 13 can be switched at Step S11 to change the connection states of the cell units $V_1$ and $V_2$ of the first power supply 4 with the generator unit 11. This optimizes the power unit according to the car speed, the load current, and the voltage and current of the generator unit 11. At Step S7, therefore, the load current and the voltage and current of the generator unit 11 are also fetched.

Figure 9A:
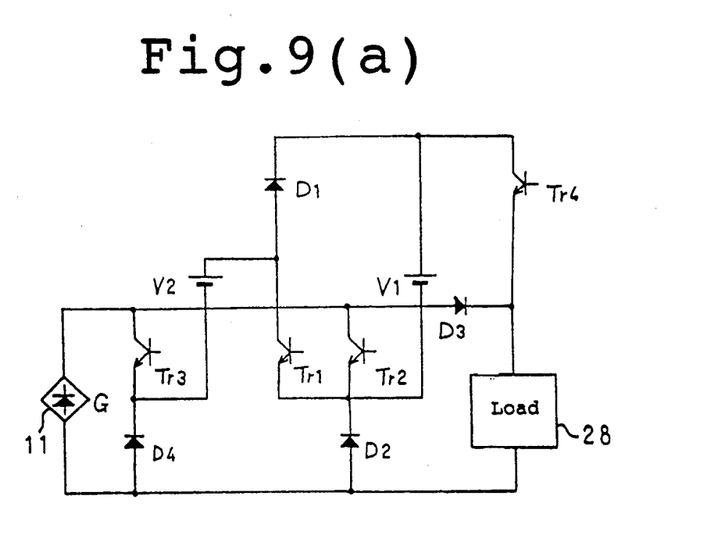
FIGS. 9(a), 9(b), 9(c), 9(d), 9(e), 9(f) and 9(g) are diagrams showing examples of the power unit structure.

The change-over circuit unit 13 is constructed as is exemplified in FIG. 9(a) to provide alternative connecting arrangements in the power supply as shown by equivalent circuits of FIGS. 9(b) to 9(g). In FIGS. 9(a) to 9(g): the numeral 11 designates the generator unit; the characters $V_1$ and $V_2$ designate the two cell units of the first power supply 4; the load designates the motor control circuit 28; letters $Tr_1$, $Tr_2$, $Tr_3$ and $Tr_4$ designate respective transistors; and letters $D_1$, $D_2$, $D_3$ and $D_4$ designate respective diodes. Each of the transistors has its base operated by a corresponding signal of the control signals from the computer unit 27 as represented by control line 31. The circuit for charging the battery is omitted from FIGS. 9(a) to 9(g).

Figure 9B:
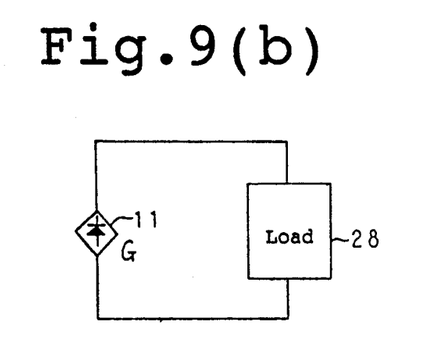
Figure 9C:
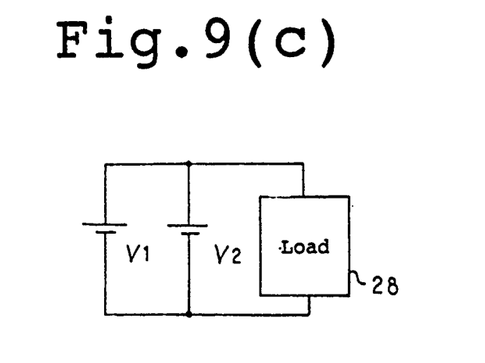
Figure 9D:
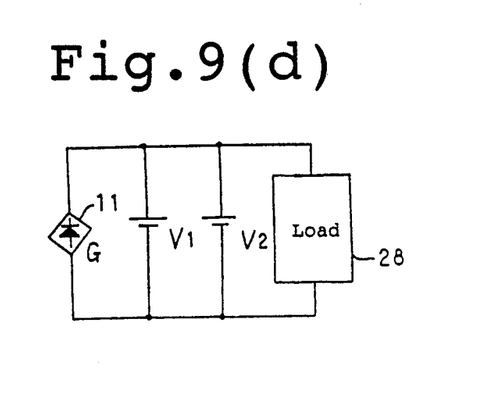

FIG. 9(b) shows the equivalent structure of the power supply when all the transistors $Tr_1$ to $Tr_4$ are turned off and only the generator unit 11 is connected by diode $D_3$ across the load 28. In this case, only the generator unit 11 is used as the power unit to establish a low power but a high energy density so that the electric car can travel a long distance. Therefore, the structure of FIG. 9(b) is the most proper for travel at low power over a long distance. FIG. 9(c) shows the equivalent structure of the power supply when only the transistor $Tr_4$ is on and the remaining transistors are off with the generator unit 11 not generating power. The transistor $Tr_4$ and the diode $D_2$ connect the battery $V_1$ across the load 28 while the diodes $D_4$ and $D_1$ connect the battery $V_2$ in parallel with the diode $D_2$ and the battery $V_1$ so that the batteries $V_1$ and $V_2$ are effectively connected in parallel with each other across the load 28. Since the voltage is as low as about 100 V, the speed is low, but the power density is high so that a high torque is generated. Thus, this structure is the most proper for a low speed but a high torque. FIG. 9(d) shows the equivalent structure of the power unit when the individual conducting states of the transistors are identical to those of FIG. 9(c) but with the generator unit 11 generating power so that the diode $D_3$ effectively connects the generator unit 11 in parallel with the parallel connected batteries $V_1$ and $V_1$. This structure is also the most proper for low speed and high torque like the structure of FIG. 9(c). In other words, the structures of FIGS. 9(c) and 9(d) are different only whether or not the generator unit 11 is generating the power, and only the transistor $Tr_4$ is on at the low speed and at the high torque whereas the remaining transistors are off.

Figure 9E:
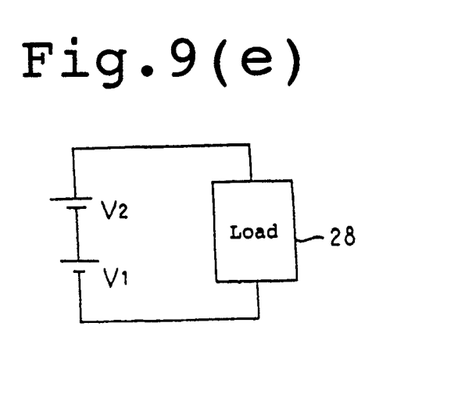
Figure 9F:
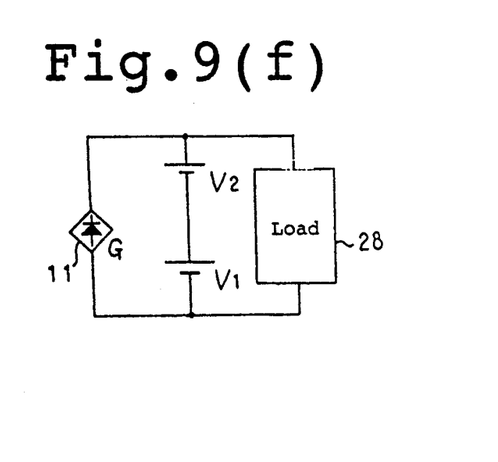
Figure 9G:
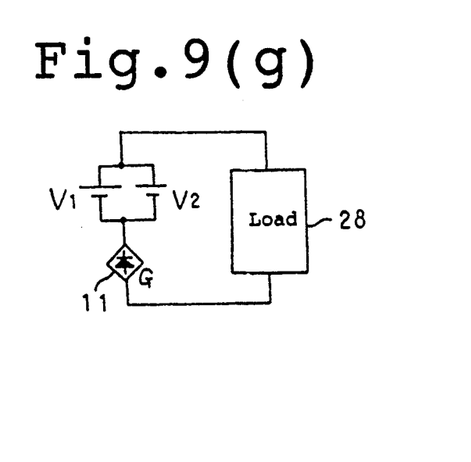

Both FIGS. 9(e) and 9(f) show equivalent structures of the power unit when the transistors $Tr_1$ and $Tr_4$ are on and the transistors $Tr_2$ and $Tr_3$ are off so that the transistor $Tr_1$ effectively connects the battery $V_2$ in series with the battery $V_1$ across the load 28 and renders the diode $D_1$ non-conductive. FIG. 9(e) shows the case in which the generator unit 11 is not generating the power, and FIG. 9(f) shows the case in which the generator unit 11 is generating the power. In these cases, the cell units $V_1$ and $V_2$ are connected in series so that the voltage can be raised for travel at high speed, but a high current cannot be produced resulting in reduced torque. Thus, both the structures of FIGS. 9(e) and 9(f) are the most proper for the travel at high speed and low torque. FIG. 9(g) shows the equivalent structure of the power unit when only the transistor $Tr_1$ is off and all the remaining transistors $Tr_2$, $Tr_3$ and $Tr_4$ are on so that the transistor $Tr_3$ effectively connects the generator unit 11 in series with the parallel connected batteries $V_1$ and $V_2$ and renders the diode $D_3$ non-conductive. In this case, the voltage is relatively high so that the energy density is also increased. Thus, this structure is the most proper for travel at medium speed over a long distance.

As has been described hereinbefore, the various power unit structures according to the aimed object can be adopted by controlling the conducting states of the transistors of the change-over circuit unit 13. The computer unit 27 changes the power unit structures in accordance with the car speed, the load current and so on, which are fetched at Step S7. What power unit structure is to be adopted may be determined by making a reference, on the basis of the values fetched at Step S7, to the tables of the power unit structure, which are prepared according to the car speed, the load current, and the voltage and current of the generator unit 11.

When operation of Step 11 is thus ended, the computer unit 27 then determines the driving force of the motor and instructs the command value to the motor control circuit 28. This determination of the driving force can be accomplished like before by referring the LUT for the third mode from the car speed and the accelerator opening, for example.

After the operation of Step S12 is ended, the routine returns to Step S2 which is then repeated at a predetermined time interval.

Thus, the power supply according to the aimed object can be constructed by the processing thus far described.

The present invention has been described in connection with its one embodiment and should not be limited thereto but can be modified in various manners. In the foregoing embodiment, for example, the first power supply 4 and the battery module 7 have two cell units but can naturally be constructed in another way. Moreover, the second power supply can be constructed of fuel cells. Still moreover, the operation of Step S11 of FIG. 8 may be modified such that the power unit structure can be determined not by the values fetched from the sensors but can be selected according to the aimed object by the driver operating the buttons.

What is claimed is:

1. A power unit for mounting on the body of an electric car, comprising:

a sensor for detecting a running condition of the car;

a first power supply mounted on the electric car body;

a second power supply module;

means for detachably mounting different, interchangeable types of said second power supply module on the electric car body;

a motor control circuit, including a computer, connected to said first power supply and said second power supply module for feeding a current to a motor as commanded by the computer;

said computer including control means for determining (1) whether said second power supply module is mounted or not and (2) for determining the type of second power supply module mounted;

setting means for connecting said first power supply and said second power supply module with said motor control circuit, in parallel or in series, responsive to the detected running condition; and said computer controlling said motor control circuit according to determinations of said control means.

* * * * *